United States Patent [19]

Lane, Jr.

[11] Patent Number: 5,358,276
[45] Date of Patent: Oct. 25, 1994

[54] SEAT BELT WEBBING CLAMP ASSEMBLY

[75] Inventor: Wendell C. Lane, Jr., Romeo, Mich.

[73] Assignee: TRW Vehicle Safety Systems Inc., Lyndhurst, Ohio

[21] Appl. No.: 142,878

[22] Filed: Oct. 25, 1993

[51] Int. Cl.5 .................................. B60R 22/42
[52] U.S. Cl. ...................... 280/806; 280/807
[58] Field of Search ................. 280/801, 806, 807

[56] References Cited

U.S. PATENT DOCUMENTS

| | | | |
|---|---|---|---|
| 4,306,735 | 12/1981 | Pfeiffer et al. | 280/806 |
| 4,378,915 | 4/1983 | Föhl | 280/806 |
| 4,438,551 | 3/1984 | Imai | 280/806 |
| 4,570,975 | 2/1986 | Kawaguchi et al. | 280/806 |
| 4,624,422 | 11/1986 | Hollowell | 280/806 |
| 4,667,981 | 5/1987 | Koide | 280/806 |
| 4,756,554 | 7/1988 | Tibbe | 280/806 |
| 4,865,263 | 9/1989 | Ervin | 242/107 |
| 5,076,610 | 12/1991 | Struck | 280/806 |

*Primary Examiner*—Kenneth R. Rice
*Attorney, Agent, or Firm*—Tarolli, Sundheim & Covell

[57] ABSTRACT

A webbing clamp assembly (10) for blocking movement of belt webbing (18) in a vehicle occupant restraint system includes first and second clamp members (70, 72) having first and second clamping surfaces (76, 86). The clamping surfaces (76, 86) define between them a passage (90) through which the belt webbing (18) is movable in a belt withdrawal direction (20). An initiator member (120) has a first portion (130) movable into engagement with the belt webbing (18) to couple the initiator member (120) for movement with the belt webbing (18) in the first direction (20). The webbing clamp assembly (10) includes an actuator (30, 42) for moving the initiator member first portion (130) into engagement with the belt webbing (18). The initiator member (120) has a portion (122) engageable with the first clamp member (70) to move the first clamp member (70) from a released condition to an engaged condition and thereby clamp the belt webbing (18) when the belt webbing (18) and the initiator member (120) move in the first direction (20). The initiator member portion (122) extends through an opening (82) in the first clamp member (70).

17 Claims, 4 Drawing Sheets

Fig.2

SEAT BELT WEBBING CLAMP ASSEMBLY

BACKGROUND OF THE INVENTION

1. Technical Field

The present invention relates to a vehicle occupant safety apparatus. More particularly, the present invention relates to a clamp assembly for clamping seat belt webbing to restrain movement of a vehicle occupant.

2. Description of the Prior Art

It is known to use seat belt webbing to restrain movement of a vehicle occupant in the event of a collision or the like. A typical seat belt system may include a retractor with an emergency locking mechanism to block rotation of the retractor spool in a belt withdrawal direction upon sensing vehicle deceleration above a predetermined deceleration. The emergency locking mechanism prevents belt webbing from being withdrawn from the retractor, thus restraining movement of a vehicle occupant using the seat belt.

It is also known to use a webbing clamp assembly to clamp seat belt webbing to restrain movement of a vehicle occupant using a seat belt. Many different types of webbing clamp assemblies are known. Typically, they include an inertia sensing mechanism which moves two clamp members together to block belt withdrawal.

SUMMARY OF THE INVENTION

The present invention is an apparatus for blocking movement of belt webbing in a vehicle occupant restraint system. The apparatus includes a first clamp member having a first clamping surface and a second clamp member having a second clamping surface spaced from the first clamping surface. The first and second clamping surfaces define between them a passage through which the belt webbing is movable in first and second directions. The first clamp member is movable relative to the second clamp member between (a) a released condition allowing movement of the belt webbing in the first direction in the passage and (b) an engaged condition clamping the belt webbing between the first and second clamping surfaces to block movement of the belt webbing in the passage. The apparatus includes an initiator member having a first portion movable into engagement with the belt webbing to couple the initiator member for movement with the belt webbing in the first direction. The apparatus also includes an actuator for moving the initiator member first portion into engagement with the belt webbing. The initiator member is engageable with the first clamp member to move the first clamp member from the released condition to the engaged condition in response to movement of the initiator member in the first direction.

In a preferred embodiment, the initiator member has a portion which extends through an opening in the first clamp member. The initiator member portion is engageable with the first clamp member to move the first clamp member from the released condition to the engaged condition in response to movement of the initiator member in the first direction.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS OF THE INVENTION

Figure 1:
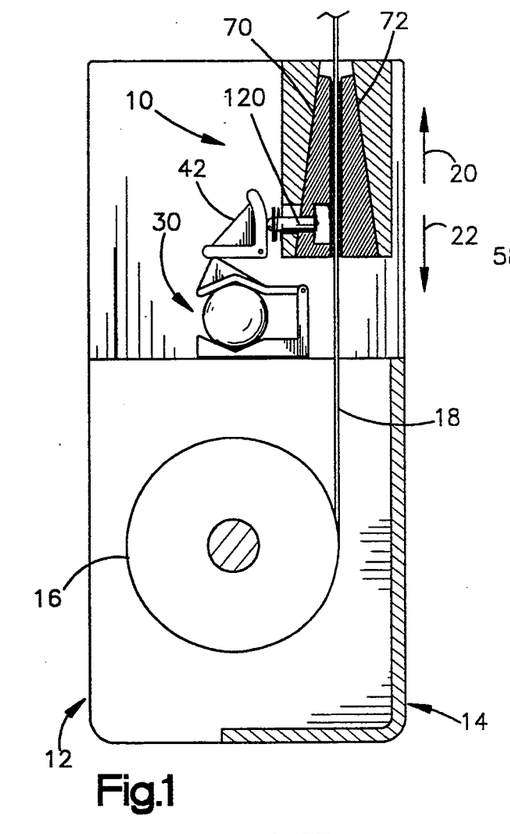
FIG. 1 is a schematic sectional view of a vehicle occupant safety apparatus including a webbing clamp assembly constructed in accordance with the present invention.

The present invention relates to a vehicle occupant safety apparatus and particularly to a webbing clamp assembly for restraining movement of an occupant of a vehicle. The present invention is applicable to various webbing clamp assemblies. As representative of the present invention, FIG. 1 illustrates a webbing clamp assembly 10.

The webbing clamp assembly 10 is fixedly connected with a seat belt webbing retractor 12. The retractor 12 includes a housing 14. A spool 16 is rotatably mounted in the housing 14. Belt webbing 18 is wound on the spool 16. The belt webbing 18 is movable in a belt withdrawal direction 20 or a belt retraction direction 22 as the spool 16 rotates in the housing 14.

The webbing clamp assembly 10 (FIG. 2) includes an inertia sensor assembly 30. The sensor assembly 30 includes a sensor housing 32 fixedly connected with the retractor housing 14 (FIG. 1). An inertia member 34, which is preferably a steel ball, rests in a cavity 36 in the sensor housing 32. A sensor lever 38 is connected with the sensor housing 32 for pivotal movement about a pivot axis 40. Movement of the inertia member 34 out of the cavity 36 results in upward movement of the sensor lever 38 relative to the housing 32.

Figure 2:
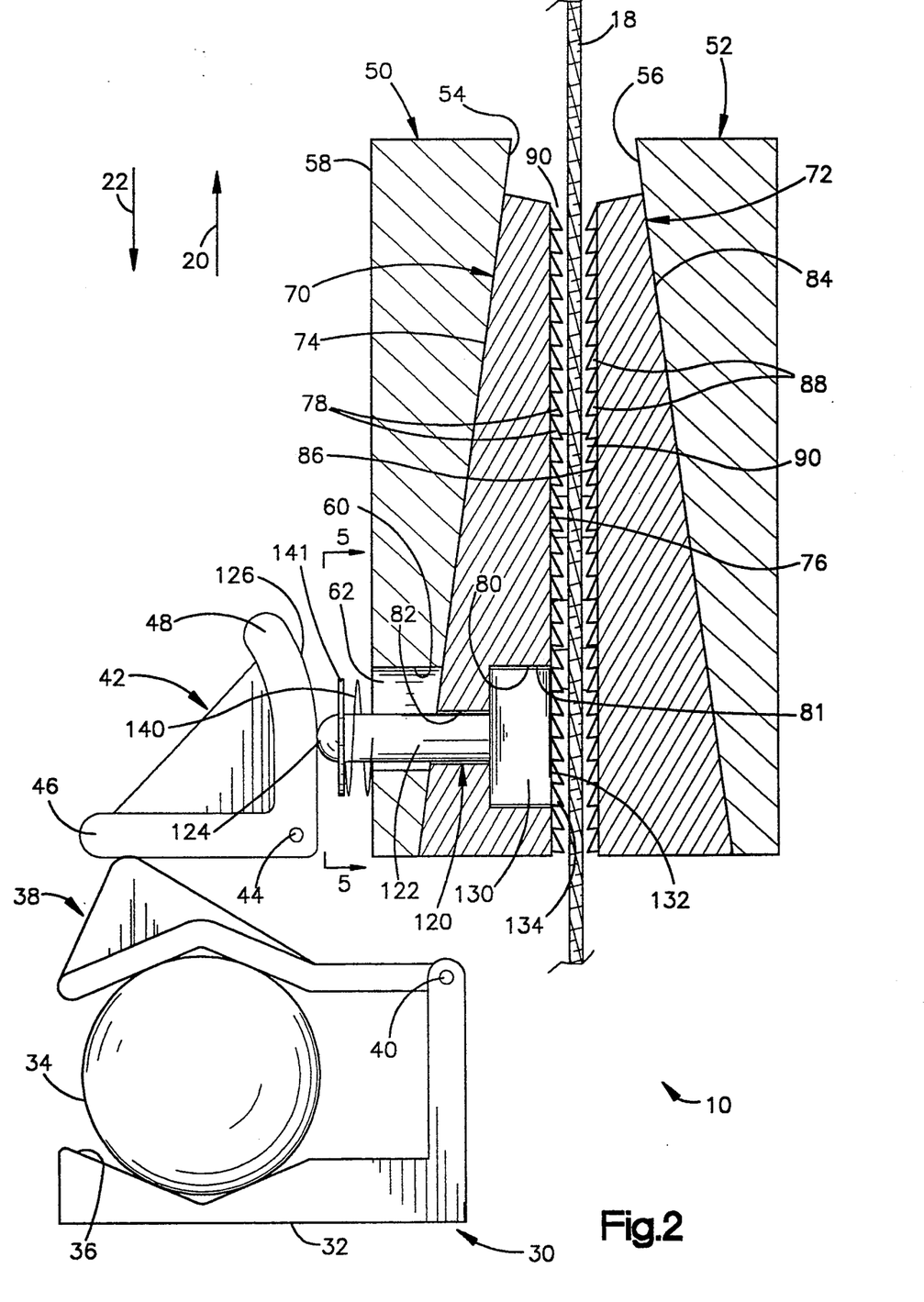
FIG. 2 is an enlarged view of the webbing clamp assembly of FIG. 1 shown in a released condition.

A pivot link 42 is connected with the retractor housing 14 for pivotal movement about a pivot axis 44. The pivot link 42 includes a first arm 46 resting on the sensor lever 38. The pivot link 42 includes a second arm 48 extending upward from the first arm 46.

Figure 5:
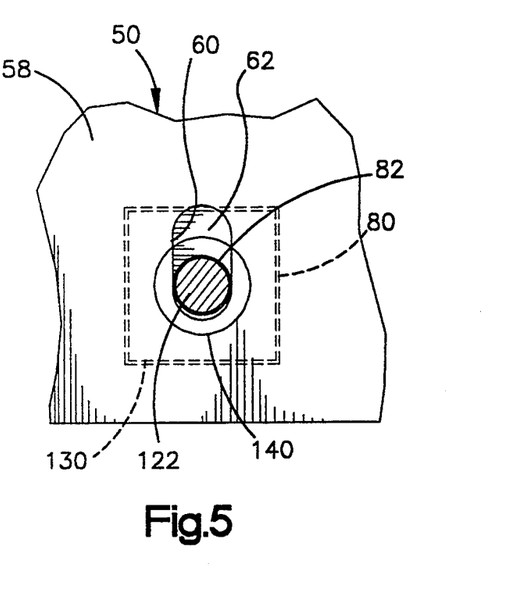
FIG. 5 is an enlarged schematic view of a portion of the webbing clamp assembly taken along line 5—5 of FIG. 2.

The webbing clamp assembly 10 includes a first housing portion 50 which is fixedly connected with the retractor housing 14. The first housing portion 50 has a planar sliding surface 54 facing in a direction away from the pivot link 42. The first housing portion 50 has an outer surface 58 facing in a direction toward the pivot link 42. The sliding surface 54 and the outer surface 58 are inclined relative to each other. An inner peripheral surface 60 of the first housing portion 50 defines an elongate slot 62 (FIGS. 2 and 5) in the first housing portion. The slot 62 extends through the first housing portion 50 between the sliding surface 54 and the outer surface 58.

The webbing clamp assembly 10 also includes a second housing portion 52 which in overall shape is generally a mirror image of the first housing portion 50 but without the slot 62. The second housing portion has a planar sliding surface 56 which faces toward the sliding surface 54 on the first housing portion 50.

A pair of clamp members 70 and 72 are supported in a known manner for sliding movement between and relative to the housing portions 50 and 52. The first clamp member 70 is generally wedge-shaped in cross-sectional configuration. The first clamp member 70 has a planar sliding surface 74 in abutting engagement with the sliding surface 54 on the first housing portion 50. The first clamp member 70 also has a planar clamping surface 76 with a plurality of teeth 78. The clamping surface 76 is inclined relative to the sliding surface 74.

A cavity 80 is formed at one point in the first clamp member 70. In the illustrated embodiment, the cavity 80 is rectangular in configuration. A side surface 81 of the first clamp member 70 partially defines the cavity 80. The cavity 80 extends from the clamping surface 76 inwardly into the body of the first clamp member 70 in a direction toward the sliding surface 74. The cavity 80 does not extend to the sliding surface 74 of the clamp member 70. Instead, a cylindrical passage 82 extends between the cavity 80 and the sliding surface 74 of the first clamp member 70. A cylindrical surface 83 of the first clamp member 70 defines the passage 82.

The second clamp member 72 is generally similar in configuration to the first clamp member 70 but without the cavity and passage. The second clamp member 72 has a planar sliding surface 84 in abutting engagement with the sliding surface 56 of the second housing portion 52. The second clamp member 72 has a planar clamping surface 86 facing in a direction toward the clamping surface 76 of the first clamp member 70. The clamping surface 86 is inclined to the sliding surface 84. A plurality of teeth 88 are formed on the clamping surface 86 of the second clamp member 72.

Figure 6:
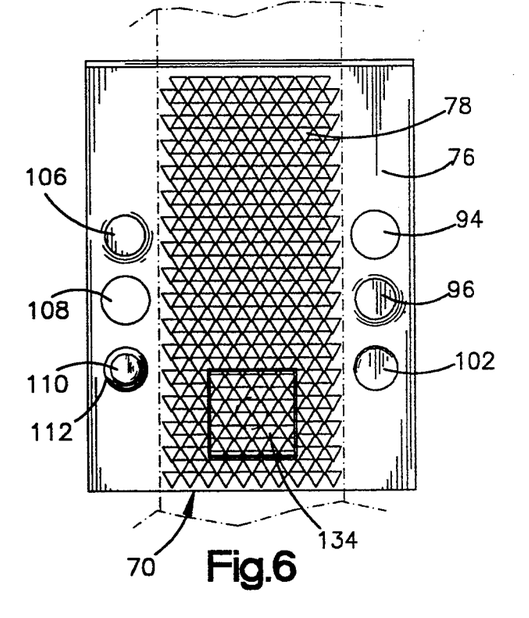
FIG. 6 is a view of one of the clamp members of the clamping assembly.
Figure 7:
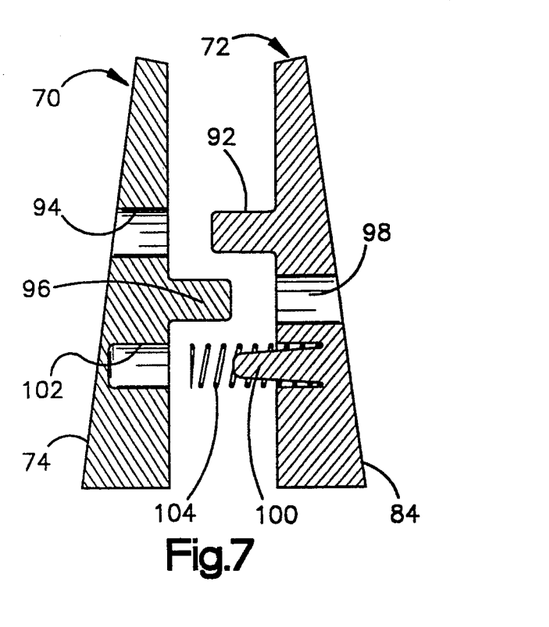
FIG. 7 is a sectional view of the clamp members.

The first and second clamp members 70 and 72, and particularly the clamping surfaces 76 and 86, define between them a belt webbing passage 90 through which the belt webbing 18 is movable in the belt withdrawal direction 20 and the belt retraction direction 22. The clamp members 70 and 72 have interfitting portions (FIGS. 6 and 7), on opposite sides of the belt webbing passage 90, for providing simultaneous sliding movement of the clamp members relative to the housing portions 50 and 52. On one side of the passage 90, a post 92 on the second clamp member 72 engages in an opening 94 in the first clamp member 70. A post 96 on the first clamp member 70 fits in an opening 98 in the second clamp member 72. A post 100 on the second clamp member 72 engages in an opening 102 in the first clamp member 70. A compression spring 104 biases the clamp members 70 and 72 outwardly away from each other.

On the opposite side of the passage 90, a similar set of posts and openings guides relative movement of the first and second clamp members 70 and 72. These parts include a two posts 106 and 110 and a third opening 108 in the first clamp member 70. A compression spring 112 extends around the post 110. The parts 106, 108 and 110 engage complementary parts (not shown) on the second clamp member 72, in a manner similar to that shown in FIG. 7. The interfitting engagement of all the posts and openings of the clamp members 70 and 72 enables the clamp members to move in a direction toward or away from each other while they simultaneously slide relative to the housing portions 50 and 52.

The webbing clamp assembly 10 (FIG. 2) includes an initiator member 120 supported in the first clamp member 70. The initiator member 120 includes a cylindrical rod portion 122. The rod portion 122 extends through the cylindrical passage 82 in the first clamp member 70. The rod portion 122 has a slip fit with the cylindrical surface 83 defining the passage 82. The rod portion 122 also extends through the slot 62 in the first housing portion 50. The rod portion 122 has a free running fit with the surface 60 defining the slot 62. A rod end portion 124 of the initiator member 120 projects from the housing portion 50 and engages an actuating surface 126 on the pivot link arm 48.

The initiator member 120 also includes a block portion 130 fixed for movement with the rod portion 122. The block portion 130 is preferably made as one piece with the rod portion 122. The block portion 130 has an outer configuration corresponding to the shape of the cavity 130 in the first clamp member 70.

The initiator member block portion 130 is closely fitted in the cavity 130. Also, the initiator member rod portion 122 is closely fitted in the cylindrical passage 82 of the first clamp member 70. Thus, the first clamp member 70 is coupled for movement with the initiator member 120. Accordingly, movement of the initiator member 120 in the belt withdrawal direction 20 results in movement of the first clamp member 70 in the belt withdrawal direction also.

A belt engagement surface 132 on the block portion 130 has a plurality of teeth 134. The belt engagement surface 132 on the initiator member 120 is normally aligned with, that is, in the same plane with, the clamping surface 76 of the first clamp member 70. The belt engagement surface 132 effectively takes the place of the portion of the clamping surface 76 which is missing at the location of the cavity 80. Thus, the initiator member belt engagement surface 132 partially defines the belt webbing passage 90.

A return spring 140 extends between the outer surface 58 of the first housing portion 50 and a retainer 141 fixed to the initiator member rod portion 122. The return spring 140 is a low force compression spring which biases the initiator member 120 toward the left as viewed in FIG. 2.

FIG. 2 illustrates the parts of the webbing clamp assembly 10 in a released condition, when the vehicle is not experiencing a deceleration above the predetermined deceleration. The inertia member 34 rests in the cavity 36 in the sensor housing 32. The return spring 140 biases the initiator member 120 out of engagement with the belt webbing 18 and thus biases the pivot link 42 into the position shown in FIG. 2. The initiator member belt engagement surface 132 and teeth 134 are spaced from the belt webbing 18. The springs 104 and 112 between the first and second clamp members 70 and 72 urge the clamp members outwardly away from each other and into the release position shown in FIG. 2. The belt webbing 18 is movable through the passage 90 between the first and second clamp members 70 and 72.

Figure 3:
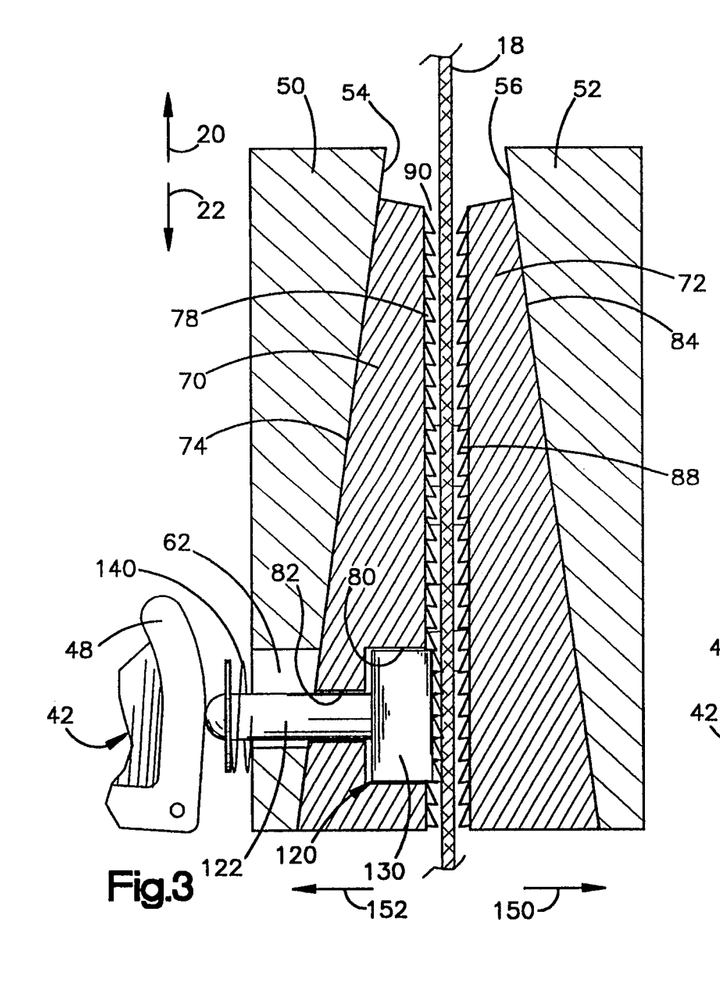
FIG. 3 is a view similar to FIG. 2 showing the webbing clamp assembly during actuation.

In the event of a vehicle deceleration above a predetermined deceleration, the inertia mass 34 moves out of the cavity 36 of the sensor housing 32. The sensor lever 38 pivots upwardly, causing the pivot link 42 to pivot about its axis 44 in a clockwise direction as seen in FIGS. 2 and 3. The pivot link 42 moves the initiator member 120 to the right as viewed in FIG. 3, against the bias of the return spring 140, in a direction as indicated by the arrow 150. The initiator member belt engagement surface 132 including the teeth 134 moves into the passage 90 and engages the belt webbing 18. The teeth 134 dig into the material of the belt webbing 18. The initiator member 120 is thus coupled for movement with the belt webbing 18 in the belt withdrawal direction 20-that is, movement of the belt webbing in the belt withdrawal direction results in movement of the initiator member in the same direction. The parts of the webbing clamp assembly are in the partially actuated condition shown in FIG. 3.

Forward movement of the vehicle occupant in the vehicle, in response to the vehicle deceleration, results in withdrawal of belt webbing 18 from the retractor 12. The belt webbing 18 moves in the belt withdrawal direction 20 through the passage 90 of the webbing clamp assembly 10. Movement of the belt webbing 18 in the belt withdrawal direction 20 causes the initiator member 120, which is coupled for movement with the belt webbing, to move in that same direction also. The initiator member block portion 130 and rod portion 122 engage the surfaces 81 and 83, respectively, on the first clamp member 70, transmitting the force of movement of the initiator member to the first clamp member. The first clamp member 70 thus moves in the belt withdrawal direction 20 also, in response to movement of the belt webbing 18 and the initiator member 120.

As the first clamp member 70 moves in the belt withdrawal direction 20, the sliding surface 74 on the first clamp member slides along the surface 54 on the first housing portion 50. The first clamp member simultaneously moves in the direction 150, toward the belt webbing 18 and toward the second clamp member 72, as it moves in the belt withdrawal direction 20. Because the clamp members 70 and 72 are connected for movement with each other, movement of the first clamp member in the belt withdrawal direction 20 results in movement of the second clamp member 72 in that direction also. The second clamp member 72 simultaneously moves in a direction 152 opposite to the direction 150, toward the belt webbing 18 and toward the first clamp member 70.

Figure 4:
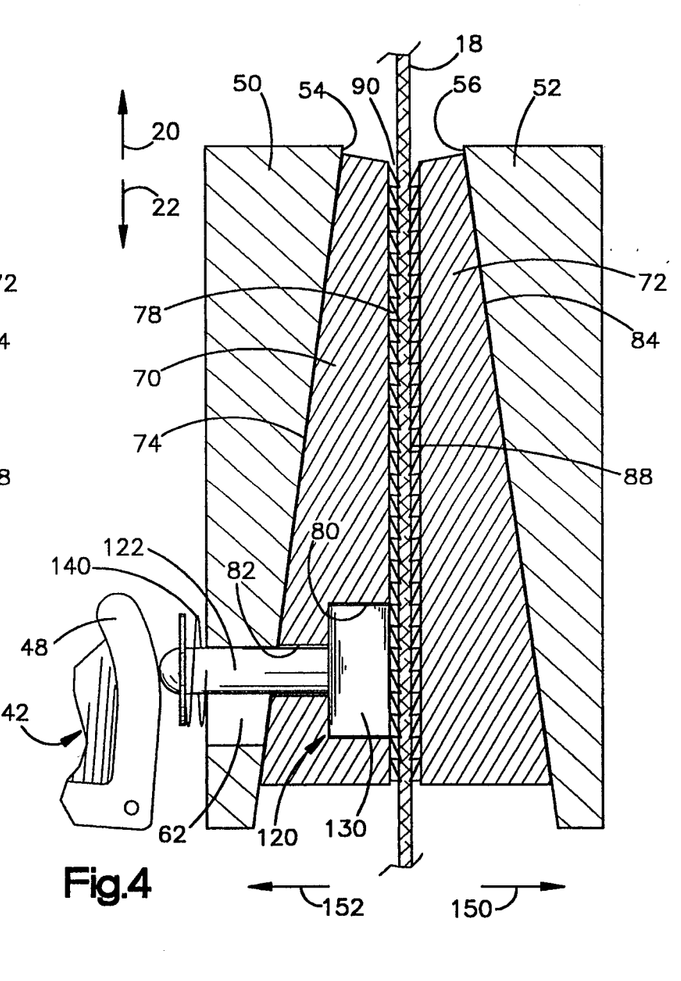
FIG. 4 is a view similar to FIG. 3 showing the webbing clamp assembly in an engaged condition.

As the clamp members 70 and 72 move toward each other, they partially close the belt webbing passage 90. The clamping surface 76 on the first clamp member 70 and the clamping surface 86 on the second clamp member 72 engage opposite sides of the belt webbing 18. The teeth 78 and 88 of the clamp members 70 and 72, respectively, dig into the material of the belt webbing 18. The webbing clamp assembly 10 is then in the engaged condition shown in FIG. 4. Movement of the belt webbing 18 in the belt withdrawal direction 20 pulls the clamp members 70 and 72 farther in the belt withdrawal direction and tightens the belt webbing clamping assembly 10. This blocks movement of the belt webbing 18 in the belt withdrawal direction 20, restraining forward movement of the vehicle occupant.

Upon the cessation of vehicle deceleration above the predetermined deceleration, the sensor assembly 30 returns to the unactuated condition shown in FIG. 2. The return spring 140 moves the initiator member 120 out of engagement with the belt webbing 18. Upon the release of tensile forces on the belt webbing 18 in the belt withdrawal direction 20, the compression springs 104 and 112 extending between the clamp members 70 and 72 move the clamp members back to the released condition shown in FIG. 2.

Figure 8:
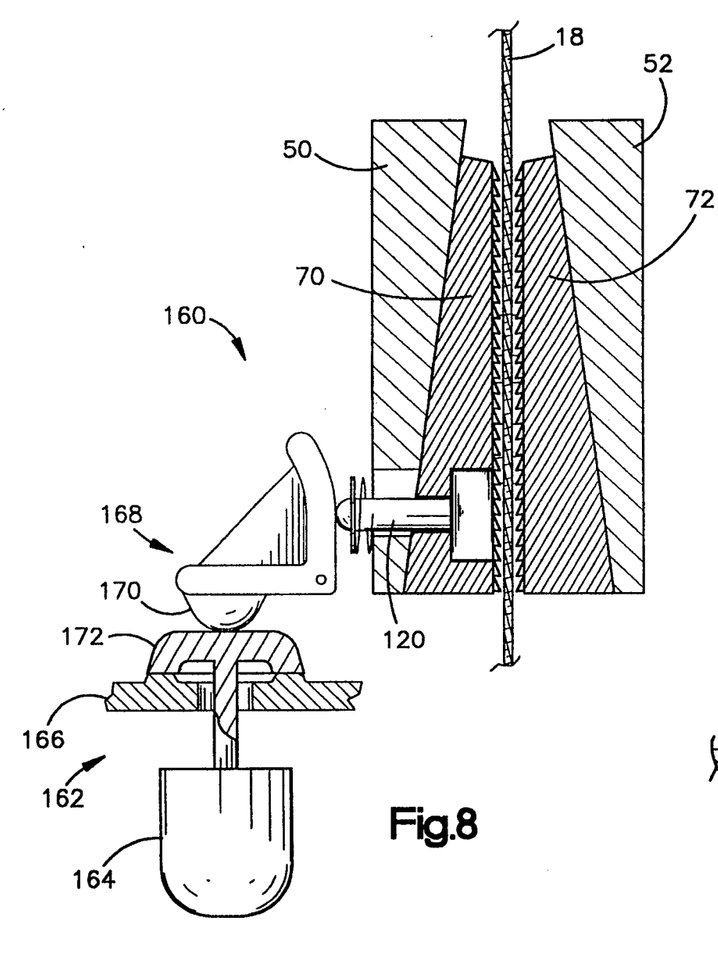
FIG. 8 is a view similar to FIG. 2 and illustrating a webbing clamp assembly in accordance with a second embodiment of the invention.

FIG. 8 illustrates a webbing clamp assembly 160 in accordance with a second embodiment of the invention.

The webbing clamp assembly 160 is generally similar to the webbing clamp assembly 10 (FIGS. 1–7), and similar parts are numbered the same. The webbing clamp 160 includes an inertia sensor assembly 162 with an inertia member in the form of a pendulum 164. The pendulum 164 is supported for swinging movement on a housing portion 166. A pivot link 168 has a portion 170 in engagement with an upper support portion 172 of the pendulum 164.

When the vehicle in which the webbing clamp assembly 160 is mounted experiences a deceleration exceeding a predetermined deceleration, the pendulum 164 swings relative to the housing portion 166. The upper support portion 172 of the pendulum 164 pivots and pushes upwardly as viewed in FIG. 8 on the pivot link portion 170. The pivot link 168 pivots relative to the housing 166 to move the initiator member 120 into engagement with the belt webbing 18 in a manner as described above. Further operation of the webbing clamp assembly 160 is similar to the operation of the webbing clamp assembly 10.

Figure 9:
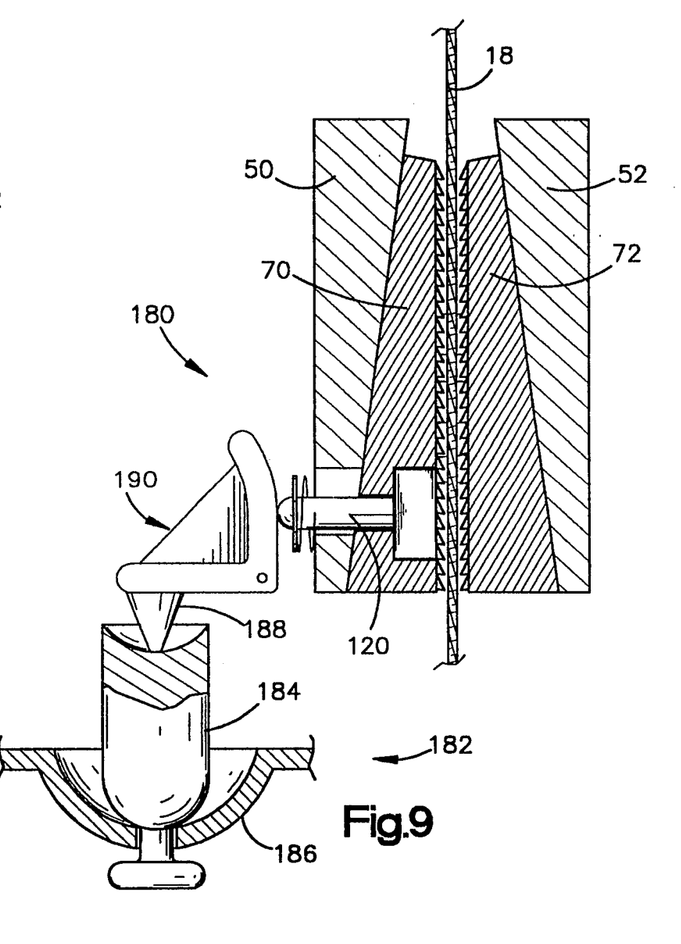
FIG. 9 is a view similar to FIG. 2 and illustrating a webbing clamp assembly in accordance with a third embodiment of the invention.

FIG. 9 illustrates a webbing clamp assembly 180 in accordance with a third embodiment of the invention. The webbing clamp assembly 180 is generally similar to the webbing clamp assembly 10 (FIGS. 1–7), and similar parts are numbered the same. The webbing clamp assembly 180 includes an inertia sensor assembly 182. The sensor assembly 182 includes a standing-man inertia member 184 supported on a housing portion 186. The inertia member 184 supports a portion 188 of a pivot link 190.

When the vehicle in which the webbing clamp assembly 180 is mounted experiences a deceleration exceeding a predetermined deceleration, the inertia member 184 pivots relative to the housing portion 186. This results in upward movement of the pivot link portion 188 and pivoting movement of the pivot link 190. The pivot link 190 moves the initiator member 120 into engagement with the belt webbing 18 in a manner as described above. Further operation of the webbing clamp assembly 180 is similar to the operation of the webbing clamp assembly 10.

From the above description of the invention, those skilled in the art will perceive improvements, changes and modifications in the invention. For example, the webbing clamp assembly need not be associated directly with a retractor. Such improvements, changes and modifications within the skill of the art are intended to be covered by the appended claims.

I claim:

1. An apparatus for blocking movement of belt webbing in a vehicle occupant restraint system, said apparatus comprising:

a first clamp member having a first clamping surface;

a second clamp member having a second clamping surface spaced from said first clamping surface, said first and second clamping surfaces defining between them a passage through which the belt webbing is movable in first and second directions;

said first clamp member being movable relative to said second clamp member between a released condition allowing movement of the belt webbing in the first direction in said passage and an engaged condition clamping the belt webbing between said first and second clamping surfaces to block movement of the belt webbing in the first direction in said passage;

an initiator member having a first portion movable between a first position not in engagement with the belt webbing and a second position in engagement with the belt webbing to couple said initiator member for movement with the belt webbing in the first direction; and actuator means for moving said initiator member first portion from the first position into engagement with the belt webbing;

said initiator member having means engageable with said first clamp member for moving said first clamp member from the released condition to the engaged condition in response to movement of said initiator member in the first direction.

2. An apparatus as set forth in claim 1 wherein said actuator means for moving said initiator member first portion into engagement with the belt webbing comprises sensing means for sensing deceleration of the vehicle exceeding a predetermined deceleration, said actuator means comprising a link member engageable with said initiator member for moving said initiator member first portion into engagement with the belt webbing in response to sensing of deceleration of the vehicle exceeding the predetermined deceleration.

3. An apparatus as set forth in claim 2 wherein said sensing means comprises an inertia member and housing means for supporting said inertia member for movement relative to the vehicle, said link member extending between said inertia member and said initiator member, said link member moving said initiator member first portion into engagement with the belt webbing upon movement of said inertia member relative to the vehicle.

4. An apparatus as set forth in claim 3 wherein said inertia member comprises a ball.

5. An apparatus as set forth in claim 3 wherein said inertia member comprises a pendulum.

6. An apparatus as set forth in claim 3 wherein said inertia member comprises a standing inertia mass.

7. An apparatus for blocking movement of belt webbing in a vehicle occupant restraint system, said apparatus comprising:

a first clamp member having a first clamping surface;

a second clamp member having a second clamping surface spaced from said first clamping surface, said first and second clamping surfaces defining between them a passage through which the belt webbing is movable in first and second directions;

said first clamp member being movable relative to said second clamp member between a released condition allowing movement of the belt webbing in the first direction in said passage and an engaged condition clamping the belt webbing between said first and second clamping surfaces to block movement of the belt webbing in the first direction in said passage;

an initiator member having a first portion movable into engagement with the belt webbing to couple said initiator member for movement with the belt webbing in the first direction; and actuator means for moving said initiator member first portion into engagement with the belt webbing;

said initiator member having means engageable with said first clamp member for moving said first clamp member from the released condition to the engaged condition in response to movement of said initiator member in the first direction;

said first clamp member including surface means for defining an opening through said first clamp member, said initiator member means engageable with said first clamp member comprising a second portion of said initiator member extending through said opening in said first clamp member and engageable with said surface means defining said opening to move said first clamp member from the released condition to the engaged condition in response to movement of said initiator member in the first direction.

8. An apparatus as set forth in claim 7 wherein said opening through said first clamp member extends in a direction transverse to the first direction of movement of the belt webbing.

9. An apparatus for blocking movement of belt webbing in a vehicle occupant restraint system, said apparatus comprising:

a first clamp member having a first clamping surface;

a second clamp member having a second clamping surface spaced from said first clamping surface, said first and second clamping surfaces defining between them a passage through which the belt webbing is movable in first and second directions;

said first clamp member being movable relative to said second clamp member between a released condition allowing movement of the belt webbing in the first direction in said passage and an engaged condition clamping the belt webbing between said first and second clamping surfaces to block movement of the belt webbing in the first direction in said passage;

an initiator member having a first portion movable into engagement with the belt webbing to couple said initiator member for movement with the belt webbing in the first direction; and actuator means for moving said initiator member first portion into engagement with the belt webbing;

said initiator member having means engageable with said first clamp member for moving said first clamp member from the released condition to the engaged condition in response to movement of said initiator member in the first direction;

said initiator member first portion comprising a generally planar surface portion of said initiator member spaced from the belt webbing when said first clamp member is in the released condition and at least partially defining the belt webbing passage, said surface portion extending generally parallel to the first direction of movement of the belt webbing, said surface portion being movable in a direction generally transverse to the first direction of movement of the belt webbing into engagement with the belt webbing to couple said initiator member for movement in the first direction with the belt webbing.

10. An apparatus as set forth in claim 9 wherein said initiator member surface portion comprises a plurality of teeth engageable with the belt webbing to couple said initiator member for movement in the first direction with the belt webbing.

11. An apparatus for blocking movement of belt webbing in a vehicle occupant restraint system, said apparatus comprising:

a first clamp member having a first clamping surface;

a second clamp member having a second clamping surface spaced from said first clamping surface, said first and second clamping surfaces defining between them a passage through which the belt webbing is movable in first and second directions;

said first clamp member being movable relative to said second clamp member between a released condition allowing movement of the belt webbing in the first direction in said passage and an engaged condition clamping the belt webbing between said first and second clamping surfaces to block movement of the belt webbing in the first direction in said passage;

an initiator member having a first portion movable into engagement with the belt webbing to couple said initiator member for movement with the belt webbing in the first direction; and actuator means for moving said initiator member first portion into engagement with the belt webbing;

said initiator member having means engageable with said first clamp member for moving said first clamp member from the released condition to the engaged condition in response to movement of said initiator member in the first direction;

wherein said first clamp member moves from the released condition to the engaged condition simultaneously in a direction parallel to the first direction of movement of the belt webbing and in a direction transverse to the first direction of movement of the belt webbing, said initiator member being supported in said first clamp member for movement relative to said first clamp member in the direction transverse to the first direction of movement of the belt webbing and into engagement with the belt webbing.

12. An apparatus for blocking movement of belt webbing in a vehicle occupant restraint system, said apparatus comprising:

a first clamp member having a first clamping surface;

a second clamp member having a second clamping surface spaced from said first clamping surface, said first and second clamping surfaces defining between them a passage through which the belt webbing is movable in first and second directions;

said first clamp member being movable relative to said second clamp member between a released condition allowing movement of the belt webbing in the first direction in said passage and an engaged condition clamping the belt webbing between said first and second clamping surfaces to block movement of the belt webbing in the first direction in said passage;

an initiator member having a first portion movable into engagement with the belt webbing to couple said initiator member for movement with the belt webbing in the first direction; and actuator means for moving said initiator member first portion into engagement with the belt webbing;

said initiator member having means engageable with said first clamp member for moving said first clamp member from the released condition to the engaged condition in response to movement of said initiator member in the first direction;

wherein said actuator means comprises inertia sensing means for moving said initiator member first portion into engagement with the belt webbing in response to vehicle deceleration above a predetermined deceleration and biasing means for biasing said initiator member first portion away from the belt webbing.

13. An apparatus for blocking movement of belt webbing in a vehicle occupant restraint system, said apparatus comprising:

a first clamp member having a first clamping surface;

a second clamp member having a second clamping surface spaced from said first clamping surface, said first and second clamping surfaces defining between them a passage through which the belt webbing is movable in first and second directions;

said first clamp member being movable relative to said second clamp member between a released condition allowing movement of the belt webbing in the first direction in said passage and an engaged condition clamping the belt webbing between said first and second clamping surfaces to block movement of the belt webbing in the first direction in said passage;

an initiator member having a first portion movable into engagement with the belt webbing to couple said initiator member for movement with the belt webbing in the first direction; and actuator means for moving said initiator member first portion into engagement with the belt webbing;

said initiator member having means engageable with said first clamp member for moving said first clamp member from the released condition to the engaged condition in response to movement of said initiator member in the first direction;

said initiator member first portion comprising a block member disposed in a cavity formed in said first clamp member, said block member having a surface partially defining said passage, said initiator member means engageable with said first clamp member comprising said block member.

14. An apparatus for blocking movement of belt webbing in a vehicle occupant restraint system, said apparatus comprising:

a first clamp member having a first clamping surface;

a second clamp member having a second clamping surface spaced from said first clamping surface, said first and second clamping surfaces defining between them a passage through which the belt webbing is movable in first and second directions;

said first clamp member being movable relative to said second clamp member between a released condition allowing movement of the belt webbing in the first direction in said passage and an engaged condition clamping the belt webbing between said first and second clamping surfaces to block movement of the belt webbing in the first direction in said passage;

said first clamp member having surface means for defining an opening through said first clamp member;

an initiator member having a first portion movable into engagement with the belt webbing to couple said initiator member for movement with the belt webbing in the first direction; and actuator means for moving said initiator member first portion into engagement with the belt webbing;

said initiator member having a second portion extending through said opening in said first clamp member and engageable with said surface means defining said opening to move said first clamp member from the released condition to the engaged condition in response to movement of said initiator member in the first direction.

15. An apparatus as set forth in claim 14 wherein said initiator member second portion comprises a rod member extending between said actuator means and said initiator member first portion, said rod member being movable by said actuator means and in said opening in a direction transverse to the first direction of movement of the belt webbing to move said initiator member first portion into engagement with the belt webbing.

16. An apparatus as set forth in claim 14 wherein:
said actuator means comprises an inertia member movable in response to deceleration of the vehicle exceeding a predetermined deceleration and linkage means for transmitting the force of movement of said inertia member to said initiator member;
said initiator member first portion comprises a belt engagement portion disposed in a cavity in said first clamp member and at least partially defining said passage; and
said initiator member second portion comprises a rod member movable with said belt engagement portion and disposed in force-transmitting relationship intermediate said linkage means and said initiator member belt engagement portion, said rod member being movable by said linkage means and in said opening in said first clamp member, upon deceleration of the vehicle exceeding a predetermined deceleration, to transmit the force of movement of said inertia member to move said initiator member belt engagement portion into engagement with the belt webbing.

17. An apparatus for blocking movement of belt webbing in a vehicle occupant restraint system, said apparatus comprising:
a first clamp member having a first clamping surface;
a second clamp member having a second clamping surface spaced from said first clamping surface, said first and second clamping surfaces defining between them a passage through which the belt webbing is movable in first and second directions;
said first clamp member being movable relative to said second clamp member between a released condition allowing movement of the belt webbing in the first direction in said passage and an engaged condition clamping the belt webbing between said first and second clamping surfaces to block movement of the belt webbing in said passage;
said first clamp member including surface means for defining an opening extending through said first clamp member in a direction transverse to the first direction of movement of the belt webbing;
an initiator member having means extending through said opening in said first clamp member and engageable with said surface means defining said opening to move said first clamp member from the released condition to the engaged condition in response to movement of said initiator member in the first direction;
said initiator member having a surface portion disposed in a cavity in said first clamp member and spaced from the belt webbing when said first clamp member is in the released condition and at least partially defining the belt webbing passage, said surface portion being movable in a direction transverse to the first direction of movement of the belt webbing into engagement with the belt webbing to couple said initiator member for movement in the first direction with the belt webbing; and
actuator means movable in response to deceleration of the vehicle exceeding a predetermined deceleration for moving said initiator member first portion into engagement with the belt webbing;
said initiator member means extending through said opening comprising a rod member movable with said surface portion and disposed in force-transmitting relationship intermediate said actuator means and said initiator member surface portion, said rod member being movable in said opening in said first clamp member, upon deceleration of the vehicle exceeding the predetermined deceleration, to transmit force from said actuator means to said initiator member surface portion to move said initiator member surface portion into engagement with the belt webbing.

* * * * *